United States Patent
Pialot et al.

(10) Patent No.: US 12,479,240 B2
(45) Date of Patent: Nov. 25, 2025

(54) METHOD FOR MANUFACTURING AN AIRTIGHT LAYER USED IN THE COMPOSITION OF A TIRE

(71) Applicant: COMPAGNIE GENERALE DES ETABLISSEMENTS MICHELIN, Clermont-Ferrand (FR)

(72) Inventors: Frederic Pialot, Clermont-Ferrand (FR); Jose Merino Lopez, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 480 days.

(21) Appl. No.: 17/619,157

(22) PCT Filed: Jun. 12, 2020

(86) PCT No.: PCT/FR2020/051001
§ 371 (c)(1),
(2) Date: Dec. 14, 2021

(87) PCT Pub. No.: WO2020/249910
PCT Pub. Date: Dec. 17, 2020

(65) Prior Publication Data
US 2022/0355619 A1  Nov. 10, 2022

(30) Foreign Application Priority Data
Jun. 14, 2019 (FR) ........................................ 1906358

(51) Int. Cl.
*B60C 5/14* (2006.01)
*B32B 3/28* (2006.01)
(Continued)

(52) U.S. Cl.
CPC .................. *B60C 5/14* (2013.01); *B32B 3/28* (2013.01); *B32B 7/08* (2013.01); *B32B 25/08* (2013.01);
(Continued)

(58) Field of Classification Search
CPC ................................... B60C 5/14; B32B 3/28
See application file for complete search history.

(56) References Cited

U.S. PATENT DOCUMENTS

| | | | | |
|---|---|---|---|---|
| 5,543,204 A * | 8/1996 | Ray | ........................... | B32B 7/12 428/184 |
| 6,136,123 A | 10/2000 | Kaido et al. | | |

(Continued)

FOREIGN PATENT DOCUMENTS

| | | | | |
|---|---|---|---|---|
| DE | 112014005976 T5 * | 9/2016 | ............... | B60C 5/14 |
| FR | 3045637 A1 | 6/2017 | | |

(Continued)

OTHER PUBLICATIONS

Machine translation WO2017109335A1 (Year: 2017).*

(Continued)

*Primary Examiner* — Jacob T Minskey
*Assistant Examiner* — Wayne K. Swier
(74) *Attorney, Agent, or Firm* — VENABLE LLP

(57) ABSTRACT

A method for manufacturing a composite airtight layer (20) used in the composition of a tire (30) comprises: a film (21) made of thermoplastic material is heated such that the film is able to plastically deform; the film is deformed (120) with the aid of corrugating means, the thickness of the film (21) being in a range from 0.01 to 0.2 mm, and the film having corrugations with a pitch and amplitude chosen in a range from 0.1 to 10 mm so as to give the film a given elongation capacity; the film is cooled such that the corrugated film is no longer able to be plastically deformed; and the corrugated (Continued)

film is coated in a matrix (22) of elastomer material, so as to form a composite airtight layer (20).

9 Claims, 6 Drawing Sheets

(51) Int. Cl.
*B32B 7/08* (2019.01)
*B32B 25/08* (2006.01)
*B32B 25/18* (2006.01)
*B32B 37/00* (2006.01)
*B60C 1/00* (2006.01)

(52) U.S. Cl.
CPC ............ *B32B 25/18* (2013.01); *B32B 37/156* (2013.01); *B60C 1/0008* (2013.01); *B32B 2250/02* (2013.01); *B32B 2250/24* (2013.01); *B32B 2307/7242* (2013.01); *B32B 2307/732* (2013.01); *B32B 2309/105* (2013.01); *B32B 2323/00* (2013.01); *B32B 2605/00* (2013.01)

(56) References Cited

U.S. PATENT DOCUMENTS

| | | | |
|---|---|---|---|
| 6,696,153 B1 * | 2/2004 | Joseph | ........................ C08J 5/06 |
| | | | 428/378 |
| 9,211,686 B2 | 12/2015 | Merino Lopez et al. | |
| 10,369,850 B2 | 8/2019 | Merino Lopez et al. | |
| 2004/0144467 A1 | 7/2004 | Joseph et al. | |
| 2008/0173381 A1 | 7/2008 | Joseph et al. | |
| 2015/0075691 A1 * | 3/2015 | Merino Lopez | ...... B60C 1/0008 |
| | | | 152/502 |
| 2016/0311259 A1 | 10/2016 | Shimizu et al. | |
| 2017/0313132 A1 | 11/2017 | Kresge et al. | |

FOREIGN PATENT DOCUMENTS

| | | | | |
|---|---|---|---|---|
| FR | 3045637 B1 * | 1/2018 | | .............. C08L 23/18 |
| RU | 2438754 C2 * | 1/2012 | | ............. B01D 25/24 |
| WO | WO-8705262 A * | 9/1987 | | ............ B31F 1/2895 |
| WO | 01/57116 A1 | 8/2001 | | |
| WO | 2008/145277 A1 | 12/2008 | | |
| WO | WO-2017109335 A1 * | 6/2017 | | ........... B60C 1/0008 |

OTHER PUBLICATIONS

Machine translation WO8705262A (Year: 1987).*
USGA Equipment Standards. Equipment Rules "Measuring the Grooves" (Year: 2021).*
Machine translation RU2438754C2 (Year: 2012).*
Generatrix Definition & Meaning—Merriam-Webster "Generatrix." Merriam-Webster.com Dictionary, Merriam-Webster, https://www.merriam-webster.com/dictionary/generatrix. Accessed Nov. 19, 2024. Originally posted on Apr. 23, 2009 (Year: 2009).*
Machine translation DE112014005976T5 (Year: 2016).*
Machine translation FR3045637A1 (Year: 2017).*
International Search Report dated Sep. 25, 2020, in corresponding PCT/FR2020/051001 (4 pages).

* cited by examiner

[Fig. 1]
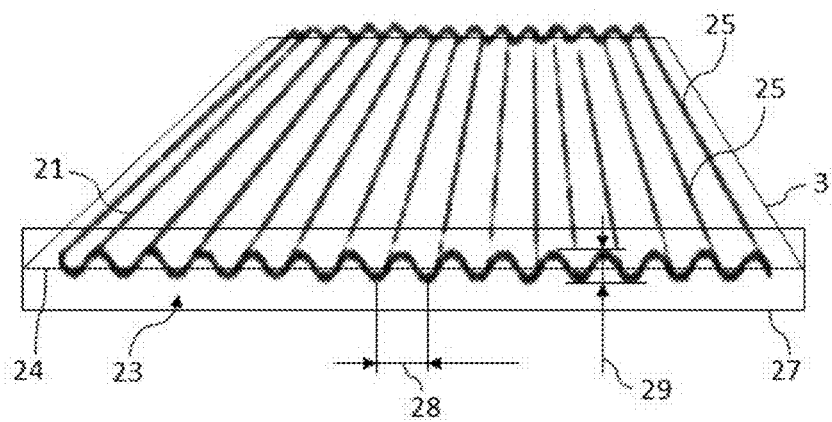
[Fig. 2]
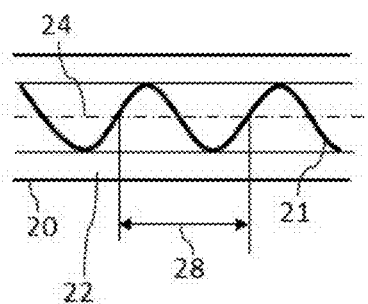
[Fig. 3]
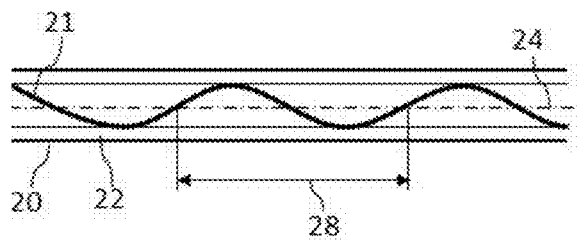

[Fig. 4]
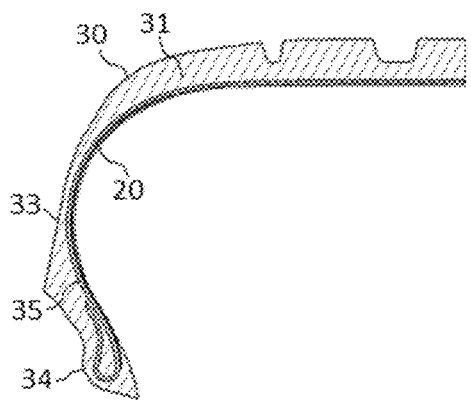
[Fig. 5]
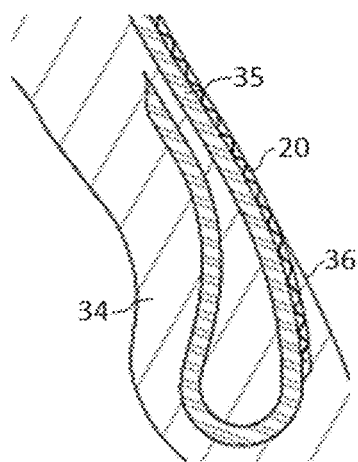

[Fig. 6]
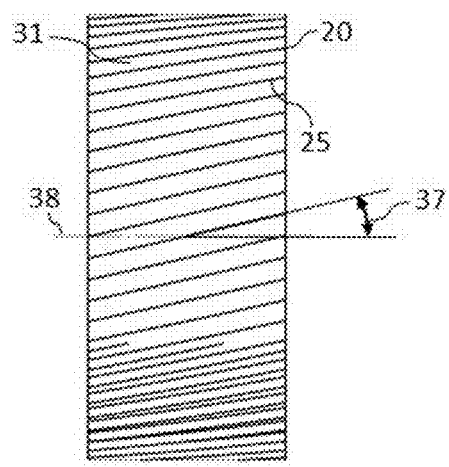
[Fig. 7]
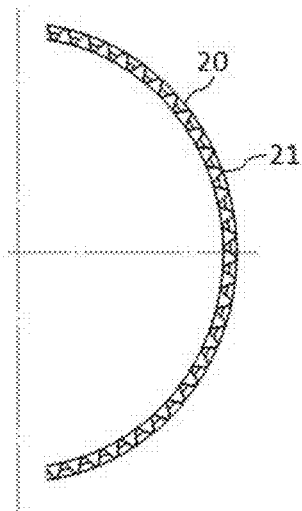

[Fig. 8]
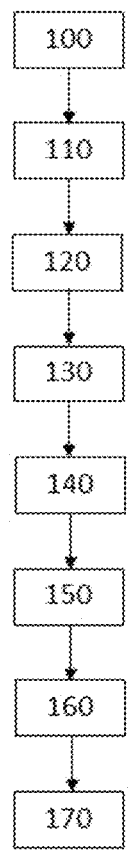

[Fig. 9]
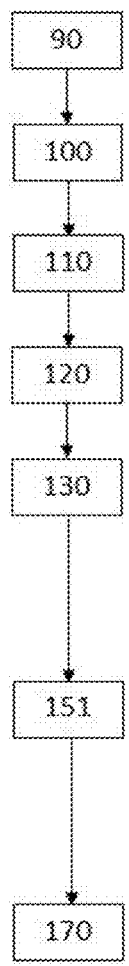

[Fig. 10]
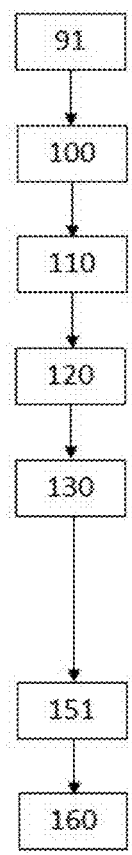

METHOD FOR MANUFACTURING AN AIRTIGHT LAYER USED IN THE COMPOSITION OF A TIRE

BACKGROUND

The invention lies in the field of the manufacture of tyres and relates more particularly to a method for manufacturing an airtight layer used in the composition of a tyre.

A tyre is divided into three distinct zones comprising a crown circumferentially hooping the tyre, two beads that allow in particular an airtight connection between the tyre and the rim of a wheel on which the tyre is mounted, and two sidewalls that radially connect each bead to the crown.

The tyre needs to comply with airtightness constraints in order to contain the pressurized gases in the chamber formed by the inner surface of the tyre and the wheel.

The pressurized gases can leak out by diffusion of the gases through the tyre.

Furthermore, the diffusion of the gases and, more particularly, of oxygen through the tyre brings about premature deterioration, in particular by oxidation, of the elements used in the composition of the tyre.

Therefore, efforts have been made to reduce the permeability of the tyre to the gases and, more particularly, to oxygen.

In particular, elastomer composites based on butyl rubber in the form of a ply that is disposed on the inner surface of the tyre so as to form an airtight layer are known.

However, a well-known drawback of compositions based on butyl elastomer or rubber is that they have large hysteresis losses, which, moreover, are present over a broad temperature spectrum.

Reducing the hysteresis of these airtight layers and therefore ultimately the fuel consumption of motor vehicles is a general aim which current technology is confronted with.

Numerous solutions have been sought in an attempt to reduce the hysteresis of the airtight layers while maintaining effective airtightness.

The document U.S. Pat. No. 6,136,123 discloses a pneumatic object provided with a layer that is airtight to the inflation gases, having a diene elastomer composition and a thermoplastic film based on thermoplastic resin. Compared with a butyl rubber, the thermoplastic film has the major advantage, on account of its thermoplastic nature, of being able to be worked as it is in the molten (liquid) state, and therefore of affording the possibility of simpler implementation, of reducing the hysteresis and of maintaining effective airtightness compared with compositions based on butyl rubber.

The application WO2008145277 for its part describes a pneumatic object provided with an elastomer layer that is airtight to the inflation gases, characterized in that said elastomer layer comprises at least one thermoplastic elastomer. That tyre, compared with a tyre comprising an airtight layer made of butyl rubber, exhibits reduced hysteresis while maintaining effective airtightness properties.

However, it still remains advantageous to find solutions that make it possible to give the inner layers effective airtightness properties and to reduce the hysteresis compared with compositions based on butyl rubber, while maintaining satisfactory deformability properties.

Specifically, it proves to be particularly complex to produce a structure that is both deformable and airtight. The elastomers used for their deformability properties generally exhibit poor airtightness. On the other hand, thermoplastics exhibit good airtightness but deformability that is so poor that it makes them difficult to use in the field of tyres on account of manufacturing and use constraints.

The application FR3045637, in the name of the applicant, attempts to respond to the problem of the deformability of thermoplastics by proposing a composite airtight layer which comprises an elastomer matrix, and fragments of films made of a thermoplastic material that is not very permeable to gases, with a surface area limited to at most 10 $cm^2$. The fragments are embedded in the elastomer matrix while being disposed parallel to the surface of the layer, so as to overlap one another and cover the surface of the layer as much as possible.

Disposing a large number of film fragments of limited surface area has the advantage of avoiding the formation of zones that are not covered by the films during phases of elongation of the layer, by virtue of the relative sliding of the overlapping films.

However, the films disposed in this way do not form a barrier that is able to effectively reduce or stop the diffusion of the gases through the tyre.

Lastly, the operation of disposing a large number of film fragments in an elastomer matrix is complex and consequently increases the cost of manufacturing the composite airtight layer.

SUMMARY

Consequently, an objective of the invention is to propose an airtight layer that is used in the manufacture of a tyre and provides improved airtightness, while giving it significant deformability and low hysteresis.

Another objective of the invention is to propose an inexpensive airtight layer that is easy to manufacture.

Thus, the present invention relates in particular to a method for manufacturing an airtight layer used in the composition of a tyre, characterized in that:
- a film made of thermoplastic material is heated such that the film is able to plastically deform,
- the film is deformed with the aid of corrugating means, the thickness of the film being in a range from 0.01 to 0.2 mm, and the film having corrugations with a pitch and amplitude chosen in a range from 0.1 to 10 mm so as to give the film a given elongation capacity,
- the film is cooled such that the corrugated film is no longer able to be plastically deformed,
- the corrugated film is coated in a matrix of elastomer material, so as to form a composite airtight layer.

The thickness and the corrugations of the film give it good deformability. The thickness of the film is chosen so as to give it good flexibility. The pitch and amplitude of the corrugations are chosen so as to give the film a predetermined elongation capacity.

The corrugated film deforms by local bending at a corrugation. Considering the corrugated film as a whole, stressing the film by pulling it in the direction of the corrugations has the effect of lengthening the corrugated film.

The elastomer matrix prevents damage to said film, such as tears, during the handling of the airtight layer or during the use of the tyre. The matrix also absorbs most of the stresses to which the airtight layer is subjected, thereby making it possible to avoid excessive stresses being applied to the corrugated film and causing tears.

Thus, when the airtight layer is stressed in the direction of the corrugations, during one or more steps of manufacturing a tyre, or when the tyre deforms when running, the airtight layer is capable of lengthening very significantly without the corrugated film being plastically deformed or being damaged.

Lastly, the airtight layer forms a continuous barrier that is able to stop the diffusion of the gases in the tyre, and is obtained easily and inexpensively.

Preferably, the matrix comprises a first and a second layer between which the corrugated film is situated, each layer being formed by one or more plies or strips of elastomer material.

Advantageously, the corrugating means comprise grooves such that the heated film deposited on the grooves conforms to the contours thereof.

According to a first embodiment variant, the corrugating means comprise a substantially flat central surface plate bearing the grooves.

The method for manufacturing a composite airtight layer is independent of the method and the usual means for building a green tyre, thereby making it possible to avoid modifying said usual means.

Advantageously, the grooved plate is made in one piece of elastomer material and forms the first layer of the matrix.

Thus, the film is corrugated directly on a layer of the matrix. The corrugated film is reinforced thereby and the risk of subsequent damage during handling is reduced. Moreover, the risk of the corrugated film being flattened during a process of calendering the composite airtight layer is reduced.

According to a second embodiment variant, the corrugating means comprise a green tyre in the course of being built, said green tyre having a radially external surface bearing the grooves, said surface being formed by a layer of elastomer material forming the first layer of the matrix.

Thus, the corrugations of the film are formed directly on the green tyre in the course of being built. The corrugated film is reinforced thereby and the risk of subsequent damage during handling is reduced. Moreover, the risk of the corrugated film being flattened during a process of roller-pressing the composite airtight layer is reduced.

Furthermore, during the laying or shaping of an airtight layer by means of a green tyre building drum, said layer passes from a flat shape to a cylindrical shape and subsequently to a toric shape, this having the consequence of stretching said layer and reducing is elongation capacity.

Thus, according to the second embodiment variant, the elongation capacity of the airtight layer is preserved.

Advantageously, adhesive is disposed between the film and the matrix in order to ensure effective cohesion of the composite airtight layer.

Preferably, the grooves have a pitch in a range from 0.1 to 10 mm, preferably from 0.1 to 2 mm and even more preferably from 0.4 to 0.8 mm, and an amplitude in a range from 0.1 to 10 mm, preferably from 0.1 to 2 mm and even more preferably from 0.4 to 0.8 mm.

A further subject of the invention is an airtight layer used in the composition of a tyre, comprising a film made of thermoplastic material and a matrix made of elastomer material, said film being coated in said matrix, the composite airtight layer being characterized in that the thickness of the film is in a range from 0.01 to 0.2 mm, and in that the film has corrugations with a pitch and amplitude chosen in a range from 0.1 to 10 mm so as to give the film a given elongation capacity.

Preferably, the thickness of the airtight layer is in a range from 0.1 to 10 mm, preferably from 0.5 to 2 mm.

Preferably, the corrugations have a pitch in a range from 0.1 to 2 mm, and preferably from 0.4 to 0.8 mm, and an amplitude in a range from 0.1 to 2 mm, and preferably from 0.4 to 0.8 mm.

Lastly, a subject of the invention is a tyre, characterized in that it comprises an airtight layer according to one of the subjects of the invention.

Preferably, the corrugations extend in such a way that the directrices of the corrugations form an angle alpha with a direction parallel to the axial direction of the tyre, and, preferably, alpha is in a range from 0 to 45°, and preferably from 0 to 20°.

During its use, the tyre deforms in several directions. The airtight layer, thus disposed, deforms by virtue of the corrugations in the different directions of the tyre, for example the radial direction and the longitudinal direction.

BRIEF DESCRIPTION OF THE FIGURES

The invention will be understood better from the remainder of the description, which is based on the following figures:

FIG. 1 is a perspective view of a corrugated film used in the composition of a composite airtight layer according to the invention;

FIGS. 2 and 3 are views in cross section in the direction of the corrugations of the film in FIG. 1, in the rest state and tensioned state, respectively;

FIGS. 4 and 5 are views in radial section of a tyre according to the invention;

FIGS. 6 and 7 are face-on and side views, respectively, of the airtight layer of the tyre in FIGS. 4 and 5;

FIGS. 8, 9 and 10 are flowcharts illustrating several variants of a method for manufacturing an airtight layer according to the invention.

DETAILED DESCRIPTION

In the various figures, identical or similar elements bear the same references. Their description is therefore not systematically repeated.

An airtight layer 20 comprises a corrugated film 21 made of thermoplastic material and a matrix 22 made of elastomer material. Said film is coated in said matrix.

The expression "coated in the matrix" means the state of the film after the coating step, said film being enveloped, on both sides, by elastomer material.

FIG. 1 illustrates a corrugated film 21 used in the composition of an airtight layer 20 according to the invention. The film has a series of corrugations 23 consisting of an alternation of recesses and protrusions of rounded shape.

In a simplified configuration in which the corrugated film 21 is disposed on a flat surface, the corrugations continue along a direction referred to as the direction of the corrugations 24 and extend along generatrices 25 perpendicular to the direction of the corrugations. The generatrices of the corrugated film are straight and mutually parallel.

The corrugations 23 give the film significant deformability. The corrugated film 21 deforms by local bending of the film at a corrugation. Considering the corrugated film as a whole, stressing said film by pulling it in the direction of the corrugations 24 has the effect of significantly lengthening it.

FIG. 2 illustrates a section of the corrugated film 21 on a section plane 26 perpendicular to the generatrices 25. Said section forms a continuous corrugated profile 27 without a break. A "profile without a break" means a profile of which the radius of curvature is preferably greater than or equal to 0.1 mm.

The corrugated profile 27 of the film is characterized by a pitch 28 and an amplitude 29 which correspond respectively to the spacing between two recesses or two protrusions in the direction of the corrugations 24 and to the distance between the apex of a recess and the apex of a protrusion in a direction perpendicular to the direction of the corrugations.

In a complex configuration in which the corrugated film 21 is disposed on a non-flat surface, such as a cylinder or a torus, the generatrices 25 of the corrugations 23 are not always straight, but are separated by a substantially constant distance. The expression "substantially constant" means that the distance between the corrugations varies by plus or minus 30%.

The corrugated film 21 is made of a thermoplastic material, making it possible to lower the coefficient of permeability or, in other words, to increase the airtightness of the airtight layer 20 while decreasing the hysteresis.

A "thermoplastic material" means a material which softens when it is heated above a certain temperature known as the "softening point" and which, in a reversible manner, hardens again when it is cooled to below this temperature.

Preferably, the corrugated film 21 comprises a plurality of layers. Each layer is made of a thermoplastic material that may be different from the thermoplastic material employed in the other layers of the corrugated film.

Preferably, each thermoplastic material making up the corrugated film 21 has the following features:
  its melting or softening point is greater than 100° C., preferably greater than 140° C. and very preferably between 170 and 300° C.;
  its permeability to air at 60° C. is less than $3.10^{-17}$ $m^4 \cdot N^{-1} \cdot s^{-1}$, preferably less than $5.10^{-18}$ $m^4 \cdot N^{-1} \cdot s^{-1}$ in order to improve the airtightness of the airtight elastomer composition.

The softening point can be measured, for example, using the method described in the standard ASTM D 1525. The permeability to air at 60° C. can be measured, for example, using the method described below.

Preferably, each thermoplastic material is chosen from the group consisting of polyolefins, vinyl chloride polymers, polystyrenes, polyamides, polyesters, ethylene/vinyl alcohol (EVOH) copolymers, polyacrylates, polyacetals, and mixtures thereof.

Preferably, the polyolefins are chosen from polyethylenes and polypropylenes.

Preferably, the vinyl chloride polymers are chosen from polyvinyl chlorides (PVCs), polyvinylidene chlorides (PVDCs), chlorinated polyvinyl chlorides (CPVCs), and mixtures thereof.

Preferably, the polyesters are chosen from polyethylene terephthalates (PETs), polybutylene terephthalates (PBTs), polycarbonates (PCs) and polyethylene naphthalates (PENs), and mixtures thereof.

The polyamides may be chosen from aliphatic polyamides and preferably from polyamides 6, polyamides 6-6, polyamides 11, and mixtures thereof.

An example of polyacrylate is polymethyl methacrylate (PMMA); an example of polyacetal is polyoxymethylene (POM).

Examples that may be mentioned of commercially available thermoplastic materials, in particular as regards the polyamides, are the PA11 Rilsan from Arkema, the PA12 Grilamid from EVS-Grimory, the PA6 Trogamid from Evonik, and the PA12 Orgasol from Arkema. They have been described, for example, along with their synthesis, in the documents "Techniques de l'ingénieur" [*The Engineer's Techniques*], ref A3360 and 0702 polyamides PA, which reference originates from "matériaux plastiques et composites" [*Plastic and composite materials*] by B. Guerin. PTFE, FEP, DVA or Pebax may also be mentioned.

The corrugated film 21 has a thickness of between 0.01 and 0.2 mm, preferably between 0.04 and 0.12 mm. Above 0.12 mm, the corrugated film becomes too stiff and is no longer able to give the composite airtight layer satisfactory deformability or flexibility. Below 0.04 mm, the risk of the corrugated film being damaged while it is being handled becomes too great. The thickness of the film can be measured easily with the aid of an optical microscope.

The elastomer matrix 22 coats the corrugated film 21 so as to form a composite airtight layer 20.

In the rest of the description, the expressions "airtight layer" and "composite airtight layer" will be used interchangeably.

The matrix 22 prevents damage to said film, such as tears, during the handling of the airtight layer or during operation of the tyre. The matrix also absorbs most of the stresses to which the airtight layer 20 is subjected, thereby making it possible to avoid excessive stresses being applied to the corrugated film 21 and causing tears.

The matrix 22 comprises a first and a second layer between which the corrugated film is situated, each layer being formed by one or more plies or strips of elastomer material.

Each layer of the matrix 22 is made of an elastomer material that may be different from the elastomer material employed in the other layer of the matrix.

Preferably, each elastomer material comprises at least one elastomer chosen from diene elastomers, thermoplastic styrene elastomers (TPSs), which are part of the family of thermoplastic elastomers (TPEs), and mixtures thereof.

The diene elastomer is preferably chosen from the group consisting of polybutadienes (BRs), natural rubber (NR), synthetic polyisoprenes (IRs), butadiene/styrene copolymers (SBRs), isoprene/butadiene copolymers (BIRs), isoprene/styrene copolymers (SIRs), butadiene/styrene/isoprene copolymers (SBIRs) and the mixtures of these elastomers.

Each elastomer material may comprise an extender oil of the elastomer, the function of which is to make it easier to process the composite airtight layer, particularly its incorporation into the pneumatic object, by lowering the modulus and increasing the tackifying power.

Each elastomer material may comprise at least one filler chosen from reinforcing fillers such as carbon black or silica, and non-reinforcing or inert fillers.

The corrugated film 21 may be rendered adhesive, that is to say treated so as to improve its adhesion to the matrix of the airtight layer. For example, the corrugated film may be rendered adhesive with an adhesive chosen from epoxy adhesives, followed by a treatment with liquid resorcinol/formaldehyde latex (RFL), and formaldehyde-based adhesives, preferably RFL adhesives. Examples that may be mentioned of RFL adhesives that can be used for rendering the corrugated film made of thermoplastic material adhesive are those described in the application WO 2001/057116.

According to the invention, the film 21 has corrugations 23 having predetermined shape characteristics.

The corrugations 23 give the film 21 significant deformability. The corrugated film deforms by local bending of the film at a corrugation. Considering the corrugated film as a whole, stressing the film by pulling it in the direction of the corrugations 24 has the effect of significantly lengthening the corrugated film.

When the airtight layer is stressed in the direction of the corrugations 24, during one or more steps of manufacturing a tyre, or when the tyre deforms when running, the airtight layer 20 is capable of lengthening very significantly without the corrugated film being plastically deformed or being damaged.

Lastly, the airtight layer forms a continuous barrier that is able to stop the diffusion of the gases in the tyre, and is obtained easily and inexpensively.

The composite airtight layer 20 according to the invention is used in the composition of a tyre 30.

By way of example, the composite airtight layer 20 described in the present application is usable as a layer that is airtight to the gases, in particular the air and the nitrogen, in any type of pneumatic objects such as inflatable boats.

FIG. 5 and FIG. 6 are views in radial section of a tyre 30 according to the invention. A radial section is understood to be a cross section in a plane containing the axis of rotation of the tyre, known as the radial plane. A direction that is contained in a radial plane and intersects the axis of rotation is known as a radial direction. A circumferential plane is understood to be a plane perpendicular to the axis of rotation of the tyre. A direction circulating at a given distance about the axis of rotation, and perpendicular to a radial direction and to the axis of rotation, is known as a circumferential direction. A direction parallel to the running direction is known as the longitudinal direction.

The tyre 30 has a crown 31 reinforced by a crown reinforcement or belt, two sidewalls 32 and two beads 34, each of these beads 34 being reinforced with a bead wire. The crown is surmounted by a tread. A carcass reinforcement is wound around the two bead wires in each bead, the turn-up of this reinforcement being, for example, disposed towards the outside of the tyre. The carcass reinforcement 35 is, in a manner known per se, made up of at least one ply reinforced with what are known as "radial" cords, for example made of textile or metal, meaning that these cords are disposed substantially parallel to one another and extend from one bead to the other so as to form an angle of between 80° and 90° with the median circumferential plane (plane perpendicular to the axis of rotation of the tyre which is situated midway between the two beads and passes through the middle of the crown reinforcement).

The inner wall 36 of the tyre has a composite airtight layer 20. The airtight layer covers the entire inner wall of the tyre, extending from one sidewall 32 to the other, at least as far as the level of the rim flange when the tyre 30 is in the fitted position. It defines the radially inner face of said tyre that is intended to protect the carcass reinforcement 35 from the diffusion of air coming from the inner space of the tyre. It makes it possible to inflate the tyre and keep it pressurized; its airtightness properties need to allow it to ensure a relatively low level of pressure loss and to keep the tyre inflated in a normal operating state for a sufficient period of time, normally several weeks or several months.

By way of example, such a composite airtight layer 20 can also be incorporated entirely into the internal structure of the tyre 30.

The thickness of the composite airtight layer 20 is preferably greater than 0.05 mm, more preferably between 0.1 mm and 10 mm, more preferably still between 0.5 and 2 mm. A person skilled in the art will be able to adapt the amplitude of the corrugations of the film depending on the thickness of the composite airtight layer.

Thus, for example, for tyres 30 of passenger vehicle type, it can have a thickness of at least 0.05 mm, preferably of between 0.5 and 2 mm. According to another example, for tyres of heavy-duty or agricultural vehicles, the preferable thickness may be between 1 and 3 mm. According to another example, for tyres of vehicles in the field of civil engineering or for aircraft, the preferable thickness may be between 1 and 10 mm.

It will be readily understood that, depending on the specific fields of application, the dimensions and the pressures involved, the implementation of the invention can vary, the composite airtight layer 20 then having several preferable ranges of thickness.

Advantageously, the ratio of the thickness of the composite airtight layer 20 to the amplitude 29 of the corrugations 23 of the corrugated film 21 within said layer is in a range from 1 to 10, and preferably from 1.2 to 2.

Compared with a usual airtight layer 20 based on butyl rubber, the composite airtight layer according to the invention has the advantage not only of having a lower hysteresis, and therefore of providing the tyres with lower rolling resistance, but also of having a much improved airtightness while having good deformability.

The shape characteristics of the corrugations 23 of the corrugated film 21, in the composite airtight layer 20, are predetermined so as to obtain a desired elongation capacity of the corrugated film and, consequently, to give the composite airtight layer good deformability.

The elongation capacity of the corrugated film 21 is defined as being the ratio between the developed length of the corrugation 23, stretched until it achieves a straight profile, and the pitch 28 of the corrugation at rest or before any elongation of the corrugated film.

To obtain a film having a given elongation capacity, the pitch and the amplitude of the corrugations are chosen in a range between 0.1 and 10 mm. By way of example, to obtain an elongation capacity of about 230% of the film, the pitch and the amplitude that are chosen are equal. To obtain an elongation capacity of about 267% of the film, the amplitude is equal to 120% of the pitch. To obtain an elongation capacity of about 178% of the film, the amplitude is equal to 70% of the pitch.

The desired elongation capacity depends on the deformations undergone by the green tyre (during manufacture), during a process of building a green tyre or during a process of vulcanizing said green tyre, and on the deformations undergone by the tyre 30 while it is being used (when running).

Preferably, the directrices 25 of the corrugations 23 form, preferably at the crown 31 of the tyre 30, an angle alpha 37 with a direction parallel to the axial direction 38 (axis of rotation) of the tyre 30, and alpha is in a range from 0 to 45°, and preferably from 0 to 20° (FIG. 6, FIG. 7).

Above 20°, the residual elongation capacity of the airtight layer 20, after shaping, is insufficient and no longer allows the airtight layer to absorb stresses during running.

Preferably, the ratio of the amplitude 29 and of the pitch 28 of the corrugations 23, during the production of the airtight layer 20, is in a range from 0.5 to 2. Below 0.5, the elongation capacity or the thickness of the airtight layer 20 are not optimized, and above 2, it becomes difficult for the elastomer material of the matrix 22 to penetrate into the recesses and the protrusions of the corrugations.

The corrugations 23 have a pitch in a range from 0.1 to 10 mm, preferably from 0.1 to 2 mm and even more preferably from 0.4 to 0.8 mm, and an amplitude 29 in a range from 0.1 to 10 mm, preferably from 0.1 to 2 mm and even more preferably from 0.4 to 0.8 mm.

By way of example, during a process of building a green tyre, an airtight layer 20 according to the invention can be disposed on a building drum for a green tyre of cylindrical shape. The cylindrical green tyre is then shaped so as to give it a torus shape. The crown 31 of the green tyre thus lengthens by up to 90% of its initial length.

According to a first embodiment variant, the directrices 25 of the corrugations 23 are contained in a circumferential plane. Thus, the composite airtight layer 20 can lengthen during the shaping step of the process for building a green tyre. The composite airtight layer can also lengthen during the use of the tyre 30 without stressing the corrugated film 21 and thus ensure the endurance thereof.

According to a second embodiment variant, the directrices 25 of the corrugations 23 are contained in a radial plane of the tyre 30. Thus, the composite airtight layer 20 can lengthen during the shaping step of the process for building a green tyre, while minimizing stresses on the corrugated film 20 in the direction of the directrices 25. The composite airtight layer can also lengthen during the use of the tyre, in particular in the event of behaviour known as deradialization of the tyre, during which the reinforcing cords of the carcass ply are no longer radial relative to the tyre.

FIG. 8, FIG. 9 and FIG. 10 are flowcharts of steps illustrating several variants of a method for manufacturing a composite airtight layer according to the invention.

First of all, in step 100, a substantially flat film of thermoplastic material is disposed on corrugating means (not shown).

By way of examples, the film can be disposed on the corrugating means manually, automatically with the aid of an applicator, or with the aid of spraying, blowing and/or suction means.

In step 110, the film made of thermoplastic material is heated such that the film is able to plastically deform. The heating step can be initiated at any appropriate time, during or after the deposition of the thermoplastic film on the corrugating means. The heating step does not affect the internal cohesion of the film, in particular when the film is a multilayer film.

By way of examples, the thermoplastic material may also cover, in the molten (liquid) state, the corrugating means such that the film is shaped during the cooling of the thermoplastic material in contact with the undulating means. The film may also be heated only during the vulcanization of the green tyre, with the proviso that the matrix of elastomer material forms the corrugating means.

The film is heated by any appropriate means, for example by heating means using pulsed air, infrared radiation, or exchange of heat with a resistor or with the corrugating means.

Under the effect of the heating means, the film passes into the molten state on account of its thermoplastic nature, and can be worked. Thus, in step 120, corrugations having shape characteristics predetermined with the aid of corrugating means are formed on the film.

The corrugating means comprise grooves such that the heated film deposited on the grooves conforms to the contours thereof. The grooves of the corrugating means thus form the cavity of moulding means.

By way of example, the corrugations can also be obtained by compression and/or friction means. Thus, the film can be laminated by a roller onto a layer with elastic behaviour so as to bring about creases on the surface of the film.

Preferably, the grooves have a pitch in a range from 0.1 to 10 mm, preferably from 0.1 to 2 mm and even more preferably from 0.4 to 0.8 mm, and an amplitude in a range from 0.1 to 10 mm, preferably from 0.1 to 2 mm and even more preferably from 0.4 to 0.8 mm.

Preferably, the corrugating means comprise a substantially flat central surface plate bearing the grooves. The plate is made from a rigid material such as steel, aluminium or resin.

By way of example, the corrugating means can also comprise a grooved roller, the film running in contact with said roller, the roller being able to laminate the film and mould or impress the shape of the grooves into it.

The grooved plate introduces into the composition means for implementing a method for manufacturing a composite airtight layer. Said method is independent of the method and the usual means for building a green tyre, thereby making it possible to avoid modifying said usual means.

According to a first embodiment variant of the corrugating means, the grooved plate is made in one piece of elastomer material and forms the first layer of the matrix. In other words, in step 90, a grooved layer is produced beforehand from elastomer material with the aid of corrugating means, such as a grooved plate or roller.

Thus, the film is corrugated directly on a part of the matrix 22. The corrugated film 21 is reinforced thereby and the risk of subsequent damage during handling is reduced. Moreover, the risk of the corrugated film being flattened during a process of calendering the composite airtight layer 20 is reduced.

According to a second embodiment variant of the corrugating means, the corrugating means comprise a green tyre in the course of being built, said green tyre having a radially external surface bearing the grooves, said surface being formed by a layer of elastomer material forming the first layer of the matrix. In other words, in step 91, a grooved layer is produced beforehand from elastomer material with the aid of green tyre building means, such as a green tyre building core.

Preferably, the grooves of the radially external surface are formed by the application and stacking (lapping) of a strip made of elastomer material.

By way of example, the grooves of the radially external surface can also be obtained by moulding means or by ridging means.

Thus, the corrugations 23 of the film are formed directly on the green tyre in the course of being built. The corrugated film 21 is reinforced thereby and the risk of subsequent damage during handling is reduced. Moreover, the risk of the corrugated film being flattened during a process of roller-pressing the composite airtight layer 20 is reduced.

Furthermore, during the laying or shaping of an airtight layer by means of a green tyre building drum, said layer passes from a flat or cylindrical shape to a cylindrical or toric shape, this having the consequence of stretching said layer and reducing is elongation capacity.

Thus, according to the second embodiment variant of the corrugating means, the elongation capacity of the airtight layer 20 is preserved.

In step 130, the film is cooled such that the corrugated film 21 is no longer able to be plastically deformed.

The film is cooled by any appropriate means, for example by cooling means using pulsed air, liquid, or contact with the corrugating means.

Next, in steps 150, 151, the corrugated film is coated in a matrix made of elastomer material. The coating of the corrugated film can be achieved in different ways.

According to a first embodiment variant of coating, in step 140, the film is demoulded from the corrugating means, in particular when the corrugating means comprise a plate bearing the grooves. Next, in step 150, the film is disposed between two thin flat layers made of elastomer material, generally known as "skims".

Preferably, the two thin layers made of elastomer material are grooved so as to make it easier to coat the corrugated film.

According to a second embodiment variant of coating, the corrugated film remains on the corrugating means, in particular when the corrugating means comprise a grooved plate made in one piece of elastomer material or, in other words, a grooved skim, and forms the first layer of the matrix. Next, a flat skim or, preferably, a grooved skim is disposed 151 so as to form the second layer of the matrix.

According to a third embodiment variant of coating, the corrugated film 21 remains on the corrugating means, in particular when the corrugating means comprise a green tyre in the course of being built, said green tyre having a radially external surface bearing the grooves, said surface being formed by a layer of elastomer material forming the first layer of the matrix. Next, a flat skim or, preferably, a grooved skim is disposed 151 so as to form the second layer of the matrix.

Optionally, adhesive is disposed between the film and the matrix; at any appropriate time before or during the coating step.

Optionally, the composite airtight layer 20 is calendered 160 so as to obtain an airtight layer of given thickness. The calendering means comprise, for the first and the second embodiment variant of coating, two rollers between which the composite airtight layer is laminated and, for the third embodiment variant of coating, a roller pressed against the radially external surface of the green tyre. In this way, an airtight layer of given thickness is obtained.

For the first and the second embodiment variant of coating, in step 170, the composite airtight layer 20 is incorporated into a green tyre.

An advantageous manufacturing variant will consist, for example during a first stage, in depositing the composite airtight layer 20 directly in a flat state on a green tyre building drum, in the form of a layer of given thickness, before covering the latter with the rest of the structure of the green tyre, using manufacturing techniques well known to a person skilled in the art.

The tyre 30 provided with the composite airtight layer 20 can be produced before or after vulcanization (or curing).

In the first case (i.e. before curing of the tyre), the composite airtight layer is simply applied in a conventional manner to the desired place, in order to form the layer. The vulcanization is subsequently carried out conventionally.

In the second case (i.e. after curing of the tyre), the airtight layer is applied to the inside of the cured tyre by any appropriate means, for example by adhesive bonding.

Other variants and embodiments of the invention can be envisaged without departing from the scope of its claims.

The invention claimed is:

1. A method for manufacturing a composite airtight layer used in the composition of a tire, the method comprising:
heating a film made of thermoplastic material such that the film is able to plastically deform;
depositing the film on a radially external surface of a green tire in a process of being built, the radially external surface having grooves;
deforming the film by depositing the film on the grooves to conform to contours thereof and obtain a corrugated film having corrugations, the corrugated film having a thickness in a range from 0.01 to 0.2 mm, the corrugations having a pitch and amplitude in a range from 0.1 to 10 mm so as to give the corrugated film an elongation capacity, and the corrugations of the corrugated film extending along generatrices that are straight and mutually parallel;
cooling the corrugated film such that the corrugated film is no longer able to be plastically deformed; and
coating the corrugated film in a matrix of elastomer material so as to form a composite airtight layer.

2. The method according to claim 1, wherein the matrix comprises a first and a second layer between which the corrugated film is situated, each of the first and second layers being formed of one or more plies or strips of elastomer material.

3. The method according to claim 1, wherein the radially external surface is formed by a layer of elastomer material forming a first layer of the matrix.

4. The method according to claim 1, wherein adhesive is disposed between the corrugated film and the matrix.

5. The method according to claim 1, further comprising calendering the airtight layer.

6. The method according to claim 5, wherein the airtight layer is calendered using calendering means.

7. The method according to claim 6, wherein the corrugations have a pitch in a range from 0.1 to 2 mm and an amplitude in a range from 0.1 to 2 mm.

8. A tire comprising an airtight layer according to claim 1.

9. The tire according to claim 8, wherein the corrugations extend in such a way that the directrices of the corrugations form an angle alpha with a direction parallel to an axial direction of the tire, and alpha is in a range from 0 to 45°.

\* \* \* \* \*